Patented Oct. 3, 1950

2,524,685

UNITED STATES PATENT OFFICE 2,524,685

POLYMERIC MATERIALS DERIVED FROM
DI-2-ALKENYL PHTHALATES

Pliny O. Tawney, Passaic, N. J., assignor to United
States Rubber Company, New York, N. Y., a
corporation of New Jersey No Drawing. Application December 4, 1946,
Serial No. 713,921

2 Claims. (Cl. 260—78.5)

My invention relates to a new class of unsaturated polymeric materials which are soluble in a variety of organic liquids but which are convertible to insoluble, infusible materials, in the presence of heat and/or catalysts, by further polymerization or by copolymerization with reactive compounds containing an ethylenic linkage. More specifically my invention relates to unsaturated polymeric materials derived from certain di-2-alkenyl phthalates.

It is well-known that the polymerization of a di-2-alkenyl phthalate leads to the formation of an insoluble gel after a relatively small amount of the monomer has been converted to the polymeric form. The resulting mixture, which consists of a minor proportion of insoluble, infusible polymer suspended in and swollen by a major proportion of unreacted monomeric di-2-alkenyl phthalate together with a small amount of low molecular weight polymer, is exceedingly difficult to manipulate in various processing operations and is practically devoid of commercial utility. For example, its use in coating compositions is severely restricted by its inability to dissolve completely in organic solvents, and even when it is applied directly, i. e., in the absence of solvents, the resulting films are weak, uneven, non-uniform and unattractive because of the presence of lumps of gelled polymer. Similarly when the mixture is cast in bulk by heating in a mold with additional catalyst until further polymerization occurs, the resulting castings are structurally weak and characterized by highly pronounced strain patterns.

Polymerization in the presence of solvents effects some increase in the yield of soluble polymeric di-2-alkenyl phthalate if the reaction is carried out in dilute solution. However, the conversion of monomer to soluble polymer by this method is still comparatively inefficient, while the relatively large volumes of solvents required in industrial-scale operations increase the overall cost of the process and simultaneously decrease the production capacity of the reaction vessel. Furthermore, such polymers prepared in carbon tetrachloride solution, as described in U. S. Patent 2,339,058, tend to discolor badly at elevated temperatures, especially when in contact with metals, which limits their usefulness in baking enamels, heat-resistant coatings, castings, etc. The polymerization of di-2-alkenyl phthalates in aqueous emulsion, as mentioned in U. S. 2,218,439, has proven inferior to polymerization in unreactive organic solvents with respect to yield of soluble, unsaturated polymer obtained.

The use of high reaction temperatures and/or large amounts of catalyst, as proposed in U. S. Patent 2,273,891, to increase the yield of soluble di-2-alkenyl phthalate polymer is objectionable since under such vigorous conditions the polymerization is less amenable to control, particularly in reaction vessels of industrial size, and premature insolubilization of the reaction mixture becomes even more difficult to avoid. Moreover, the use of large amounts of peroxidic catalysts appreciably increases the overall cost of the polymerization and tends to contaminate the polymeric product with the fragments and decomposition products of the catalyst.

The use of polymerization inhibitors, such as hydroquinone and copper salts, to avert gelation of the polymerizing reaction mixture, is likewise undesirable. In practice it is necessary to carry out a very careful and complete separation of these inhibitors from the polymeric product to avoid discoloration thereof as well as retardation or complete inhibition of its subsequent conversion to the insoluble, infusible state. On a commercial scale this separation is particularly laborious and time-consuming and adds to the overall cost of the product.

The copolymerization of a di-2-alkenyl phthalate with a homopolymerizable monomer leads rapidly to the formation of an insoluble product before more than a very minor amount of the di-2-alkenyl phthalate has become incorporated in the copolymer. This is shown by Garvey and Alexander in U. S. Patent 2,202,846.

I have now unexpectedly discovered that, by polymerizing a mixture of any of certain di-2-alkenyl phthalates with a sufficient quantity of a monomer which itself possesses little tendency to homopolymerize, specifically any of the certain alkyl-2-alkenyl ethers, high yields of soluble, fusible unsaturated copolymers are obtained. In further contrast to the prior art, my method, by which the major proportion of a monomeric di-2-alkenyl phthalate can be converted to the polymeric form without insolubilization, proceeds smoothly at moderate temperatures and does not require the presence of solvents, inhibitors, excess catalyst or other special reaction conditions heretofore employed by the art in attempts to avert premature gelation. The resulting soluble unsaturated copolymers are obtained in high yields, are uniform in character, and are uncontaminated with the high molecular weight insoluble gel encountered in many of the prior art polymers of di-2-alkenyl phthalates, and hence the necessity for extensive purification is obviated. My new copolymers totally dissolve in a number of common organic solvents, and they cure rapidly and completely to the insoluble, infusible state with little or no discoloration even when heated as high as 200° C. This combination of attributes makes my products well suited to the formation of coating compositions, particularly baking varnishes and white enamels.

Whereas di-2-alkenyl phthalate polymers prepared in inert solvents according to prior art possess relatively small amounts of unsaturation and hence cure slowly and in many cases incompletely, my new copolymers can be readily cured to the insoluble, infusible state. The copolymerizable 2-alkenyl ethers employed in my invention have proven remarkably efficient in repressing gelation even when they are present in the reaction mixture in relatively small amounts.

That my new products are true copolymers is proven by elementary analysis and other specific tests. They contain, attached to the polymer chain, not only ether groups, but also unsaturated ester groups. The latter can be polymerized to convert the soluble copolymers to insoluble, cross-linked products. Moreover, these unsaturated ester groups will also undergo alcohol interchange reactions with other saturated and unsaturated alcohols, thereby converting my products into other modified copolymers having desirable properties.

Of the di-2-alkenyl phthalates useful in my invention, diallyl phthalate and dimethallyl phthalate have proven particularly satisfactory. The operable alkyl 2-alkenyl ethers have the type formula $CHR=C(R')-CH_2-O-R''$ where one of the groups R and R' is hydrogen, and the other is one of the radicals hydrogen, methyl, and ethyl, and where R'' is an alkyl group, e. g., methyl, ethyl, propyl, butyl, isobutyl, hexyl, octyl, etc. Exemplary of these ethers are allyl methyl ether, methallyl ethyl ether, and crotyl methyl ether. In general, the copolymerization of a di-2-alkenyl phthalate with the alkyl ether of a different 2-alkenyl alcohol, e. g., diallyl phthalate with methallyl ethyl ether, tends to give the highest yield of copolymeric product. For a given molar ratio of di-2-alkenyl phthalate and alkyl 2-alkenyl ether, the 2-alkenyl ethers of the lowest alcohols, e. g., allyl methyl ether, will yield harder copolymers than those of higher homologues, e. g., allyl hexyl ether, which are of the softer and more flexible type.

The relative proportions of the di-2-alkenyl phthalate and the alkyl 2-alkenyl ether present in the initial copolymerizable reaction mixture may be varied over a considerable range depending upon the properties desired in the resulting product. For example, copolymerization of the di-2-alkenyl phthalate with as little as approximately 5% of methallyl ethyl ether (based on the weight of the di-2-alkenyl phthalate), is sufficient to repress the gelation of the reaction mixture during the early stages of the copolymerization and to ensure an increased yield of soluble, unsaturated product. The mole ratio of ether/phthalate may range from 1:9 to 5:1. The higher the amount of methallyl ethyl ether present in the reaction mixture, the higher the amount of the monomeric di-2-alkenyl phthalate which can be converted to the copolymeric form without insolubilization, and optimum yields of soluble product can be obtained with as much as 200% of methallyl ethyl ether. In a similar fashion, other 2-alkenyl ethers in comparable molar quantities can be substituted for methallyl ethyl ether to yield soluble, unsaturated products. Since my copolymers are readily soluble in the alkyl 2-alkenyl ethers, the copolymerizations may be conducted in the presence of an excess of the ether, e. g., 300–500%, if desired, for the resulting mobile, free-flowing solutions are easily handled in transfer, mixing, storage and other mechanical operations to which the solid copolymers themselves may be less amenable.

In the preparation of my new copolymers the reaction temperatures may range from about 25° C. up to and somewhat above the boiling point of the alkyl 2-alkenyl ether, and for overall economy it is preferred to operate in the latter range, i. e., at the reflux temperature of the reaction mixture. In the copolymerization of di-2-alkenyl phthalates with the higher-boiling alkyl 2-alkenyl ethers, however, temperatures below the reflux temperature, e. g., 100–120° C., often prove satisfactory as well as more convenient. Higher temperatures than the reflux temperature can be employed, of course, but the necessary pressure equipment entails additional expense without offering any marked compensating advantages. Suitable polymerization catalysts include hydrogen peroxide, acetyl peroxide, acetyl benzoyl peroxide, succinyl peroxide, benzoyl peroxide and tertiary-butyl hydrogen peroxide, the concentrations thereof being preferably maintained in the approximate range of 1 to 5 mole-percent of the mixture of copolymerizable monomers. The course of the copolymerizations can be followed by observing the increase in viscosity of the reaction mixtures, and after halting the reactions by cooling, the copolymers can be readily isolated from the reaction mixtures by distilling off any unreacted starting materials or by extracting them with a solvent such as n-hexane in which the copolymer is insoluble. Although unnecessary for many commercial applications, the copolymers may be further refined if desired by dissolving them in a solvent such as acetone and precipitating them with a non-solvent, e. g., n-hexane.

The resulting polymeric materials can be cast or molded in known manner to form rods, blocks, sheets, etc. They can also be dissolved in appropriate solvents and employed as lacquers or as impregnating and water-proofing compositions. In the preparations of such solutions it is unnecessary to isolate the copolymers as is done in the prior art, since higher-boiling solvents can be added directly to the crude copolymerization reaction mixtures, and any unreacted ether can then be removed by distillation. This effects a further saving in both the time and expense of the process and adds to the economic advantage of my copolymers in such applications.

Application of heat to compositions containing my unsaturated copolymers, particularly in the presence of polymerization catalysts, induces further polymerization and the resulting cross-linked products are quite indifferent to heat, and strongly resistant to attack by solvents. Suitable dyes, pigments, fillers, plasticizers and resins can be incorporated with my copolymers at the soluble, fusible stage prior to final cure.

My soluble, unsaturated copolymers can also be converted to the insoluble, infusible state by interpolymerization with reactive monomers containing an ethylenic linkage, e. g., methyl acrylate, vinyl acetate, diethyl fumarate, allyl acrylate, diallyl fumarate, etc. At the soluble stage my copolymers dissolve readily in a number of these reactive monomers to yield solutions which are often quite fluid even at high solids content. Such solutions can be totally copolymerized, leaving no solvent to be evaporated, and are useful not only as coating compositions, but particularly in casting, laminating and impregnating operations where articles capable of being preformed and then "set" or cured in their final shape are desired.

The following examples disclose my invention in more detail, all parts being by weight.

*Example 1*

To demonstrate my discovery that copolymerization of any of the certain di-2-alkenyl phthalates with an alkyl 2-alkenyl ether represses gelation of the reaction mixture and thereby increases the yield of soluble, unsaturated polymeric material, mixtures containing various proportions of di-2-alkenyl phthalates and alkyl 2-alkenyl ethers are heated with a commercial 60% solution of tertiary-butyl hydrogen peroxide as catalyst at 120° C. in sealed vessels until the point of incipient gelation is attained—save in the case starred (*) in the table below which displays no sign of incipient gelation after heating for the time indicated. The copolymerizations are then halted by cooling and the reaction mixtures are poured into a commercial grade of n-hexane. The precipitated materials are further purified by dissolving them in chloroform and precipitating them with n-hexane. After drying the products to constant weight in vacuo, the amounts of the polymeric products are determined.

The pertinent data are summarized in the table, including the weights of the copolymerizable monomers, peroxide catalyst and polymeric product as well as reaction times. For purposes of comparison only, the homopolymerization of di-2-alkenyl phthalates, both alone (I—$a$,—$c$) and in the presence of a solvent (I—$g$), are included to illustrate more fully the advantages of my invention.

*Table*

| | Dimethallyl Phthalate | Diallyl Phthalate | Allyl Ethyl Ether | Methallyl Ethyl Ether | Peroxide | Reaction Time, Hours | Polymeric Product |
|---|---|---|---|---|---|---|---|
| $a$ | 100 | | | | 5.50 | 15.0 | 42.6 |
| $b$ | 100 | | 31.4 | | 5.48 | *68.0 | 72.5 |
| $c$ | | 100 | | | 0.311 | 11.0 | 28.1 |
| $d$ | | 100 | | 4.5 | 0.813 | 11.0 | 38.3 |
| $e$ | | 100 | | 10.15 | 0.915 | 9.0 | 40.7 |
| $f$ | | 100 | | 17.50 | 1.050 | 14.5 | 56.7 |
| $g$ | | 100 | | (1) | 0.621 | 52.0 | 50.3 |

*No sign of incipient gelation.
[1] 100 parts of benzene in place of the alkyl 2-alkenyl ether.

Comparison of I—$c$ with I—$d$ shows the marked effect of copolymerizing even small amounts of an alkyl 2-alkenyl ether with the di-2-alkenyl phthalate in repressing gelation and increasing the yield of soluble, unsaturated polymeric material. Examples I—$e$ and —$f$ demonstrate the increased yields of soluble polymer obtainable with the presence of increased amounts of the copolymerizable alkyl 2-alkenyl ether in the reaction mixture, and I—$b$ shows that when the copolymerization is carried out with a sufficient quantity of the alkyl 2-alkenyl ether, the reaction can proceed to high yields with no danger of gelation. A comparison of I—$f$ with I—$g$ shows the copolymerizable alkyl 2-alkenyl ether to be more than five times as effective (on a weight basis) as an inert solvent, viz., benzene, in repressing gelation and increasing the yield of soluble, unsaturated polymeric material.

*Example 2*

A mixture of 246 parts of diallyl phthalate, 100 parts of methallyl ethyl ether and 11.6 parts of a 60% solution of tertiary-butyl hydrogen peroxide is heated at reflux for 43 hours. One hundred parts of the reaction mixture are poured into n-hexane. After drying to constant weight in vacuo, 48 parts of colorless polymeric solid are obtained which corresponds to a total yield of 166 parts of copolymer as the reaction product.

Analysis—found: C, 68.40%; H, 6.50%; iodine number (Wijs), 64.8.

Since the theoretical carbon contents of the two monomers differ by only approximately 4.0%, the relative amounts of the two monomers which have entered the copolymer chain cannot be determined with high precision from the elementary analysis. However, the analytical data indicate a copolymer containing approximately 81.5% by weight of diallyl phthalate and 15.5% of methallyl ethyl ether. The iodine number indicates the presence in the copolymer of unsaturation which is available for further polymerization.

Three parts of the solid copolymer of Example 2 are dissolved in a mixture of 2.5 parts of xylene and 7.5 parts of chloroform and flowed onto glass and onto steel panels. After baking for 20 minutes at 200° C. clear, colorless films are obtained which are resistant to solvents and substantially infusible.

A polymer prepared according to the method of the prior art by heating a mixture of 24.6 parts of diallyl phthalate, 7.2 parts of carbon tetrachloride and 0.612 part of a 60% solution of tertiary-butyl hydrogen perioxide at 120° for 4.75 hours, when subsequently baked on glass, yields a clear, yellow film, while the film baked on steel is opaque and coal-black, and both films are readily attacked by acetone. The poor film-forming properties of this polymer are in marked contrast to those of my copolymers, which cure rapidly and completely under the same conditions without discoloration or loss of clarity. The superior curing properties of my soluble copolymers are believed to be associated with their high amount of unsaturation.

Six and nine tenths parts of the copolymer of Example 2 are dissolved in 3.1 parts of n-butyl acrylate together with 0.05 part of benzoyl peroxide and cured by heating in a plate mold for 15 hours at 50° C. and then for two hours at 90° C. The colorless product is tough, extremely flexible, and insoluble in acetone and chloroform.

One hundred parts of the crude reaction product from the preparation of the copolymer of Example 2 are mixed with 10 parts of diethyl fumarate and heated at 90° C. and 2 mm. pressure until 22.5 parts of unreacted methallyl ethyl ether have distilled out. Ten parts of the residual solution are admixed with 0.26 part of benzoyl peroxide and cured by heating in a plate mold for 40 hours at 70° C. and then for 2 hours at 120° C. The resulting clear sheet is tough, somewhat flexible, insoluble in acetone, and has Rockwell hardnesses of L118, M107 and P93.

While I have shown and described various embodiments of the invention, it is to be understood that the invention is susceptible to other modifications which appear within the spirit of the invention and the scope of the appended claims.

Having thus described my invention, what I claim and desire to protect by Letters Patent is:

1. A soluble, fusible, unsaturated copolymer of a monomeric di-2-alkenyl phthalate, wherein the 2-alkenyl groups are selected from the class consisting of allyl and methallyl and a monomeric alkyl 2-alkenyl ether having the formula $$RCH=C(R')-CH_2OR''$$

where one of the radicals R and R' is hydrogen and the other is selected from the class consisting of hydrogen, methyl, and ethyl, and R'' is alkyl the said copolymer being derived from a polymerizable mix containing 5-500% of ether based on the weight of the phthalate.

2. A soluble, fusible, unsaturated copolymer of monomeric diallyl phthalate and monomeric ethyl methallyl ether the said copolymer being derived from a polymerizable mix containing 5-500% of ether based on the weight of the phthalate.

PLINY O. TAWNEY.

REFERENCES CITED

The following references are of record in the file of this patent:

UNITED STATES PATENTS

| Number | Name | Date |
| --- | --- | --- |
| 2,378,195 | D'Alelio | June 12, 1945 |